(12) United States Patent
Wang

(10) Patent No.: US 8,786,422 B2
(45) Date of Patent: Jul. 22, 2014

(54) VISUAL WARNING DEVICE HAVING INTERIOR SPOTLIGHTS CAPABLY ILLUMINATING IN PREFERABLE DIRECTION

(76) Inventor: Mao-Shen Wang, Sindian (TW)

(*) Notice: Subject to any disclaimer, the term of this patent is extended or adjusted under 35 U.S.C. 154(b) by 255 days.

(21) Appl. No.: 13/470,540

(22) Filed: May 14, 2012

(65) Prior Publication Data

US 2013/0300556 A1 Nov. 14, 2013

(51) Int. Cl.
*G08B 21/00* (2006.01)

(52) U.S. Cl.
USPC ....... 340/471; 340/468; 340/815.45; 362/493

(58) Field of Classification Search
USPC ......... 340/468, 469, 470, 471, 472, 480–490, 340/815.4, 815.45; 362/459, 493
See application file for complete search history.

(56) References Cited

U.S. PATENT DOCUMENTS

| | | | |
|---|---|---|---|
| 6,989,743 B2* | 1/2006 | Pederson | 340/815.45 |
| 2010/0194556 A1* | 8/2010 | LaRosa | 340/471 |

* cited by examiner

*Primary Examiner* — Jeffery Hofsass
(74) *Attorney, Agent, or Firm* — Bacon & Thomas, PLLC

(57) ABSTRACT

A visual warning device has both a warning function to provide various colored flashing lights and a lighting function to adjustably project the lighting in preferable direction, which at least comprises a lighting device comprising an interior spotlight fixedly placed in the inside of the visual warning device and a beacon-like waterproof cover for mostly shielding the interior spotlight by outside exposure securely fastened onto the visual warning device, so that the interior spotlight has no required for an additional waterproof means pivotally mounted thereon as before; in particular, the interior spotlight further has both a vertical drive means and a horizontal drive means designed by uncovered structure, due to both the vertical drive means and the horizontal drive means unnecessarily concealed or placed in the inside of the interior spotlight as before, the interior spotlight has much simpler structure than before and more saving cost.

3 Claims, 4 Drawing Sheets

VISUAL WARNING DEVICE HAVING INTERIOR SPOTLIGHTS CAPABLY ILLUMINATING IN PREFERABLE DIRECTION

BACKGROUND OF THE INVENTION

1. Field of the Invention

The invention relates to a visual warning device applicable to an emergency vehicle, more particularly to a visual warning device when applicable to an emergency vehicle having both a warning function to provide various colored flashing lights and a lighting function to adjustably project the lighting in preferable direction.

2. Description of the Related Art

As shown in FIG. 1, a flashing colored light 90 refers to any of several visual warning devices, which may be known as light bars or beacons as well as other components such as sirens or rotating lights, permanently fixed on the roof of an emergency vehicle 95, such as fire truck, police car and ambulance, to provide a variety of colored light signals for giving a warning when the emergency vehicle 95 is speeding on the street due to some emergency duty.

However, the conventional flashing colored light 90 do not further provide a lighting function, if the lighting under some circumstances is so indispensable to the emergency vehicle 95 for lighting some places or locations to be lighted, it is so time-consuming to continually move the emergency vehicle 95 to arrive at a preferable position and then to use the head light of the emergency vehicle 95 for lighting.

SUMMARY OF THE INVENTION

Therefore, the main object of the present invention is to provide a visual warning device having both a warning function and a lighting function which is particularly applicable to an emergency vehicle if needed for emergency use to provide various colored flashing lights or/and if needed for lighting use to adjustably project illuminable lighting in any preferable directions.

Another object of the present invention is to provide a visual warning device which comprises a box-like flashing-light shell having LED-based warning light means for displaying flashing symbols, reverse characters or arrows, a covered plate having one or more receiving holes evenly formed thereon and tightly covered onto and assembled with the flashing-light shell and one or more lighting device through manually remotely control or/and wireless remotely control to adjust the lighting projected in preferable direction, wherein each lighting device comprises an interior spotlight fixedly placed in the inside of the flashing-light shell and a beacon-like waterproof cover for mostly shielding the interior spotlight by outside exposure securely fastened onto the receiving holes of the covered plate. Particularly, due to each interior spotlight having its own corresponding beacon-like waterproof cover as an exposed waterproof accessory, the specific structure of the interior spotlight is that an additional waterproof shade pivotally mounted to the interior spotlight is no required, resulted in that the interior spotlight is capable of being designed to have much simpler structure than before.

Still another object of the present invention is to provide a visual warning device having an interior spotlight possessed a simple and exquisite structure which is suitably placed in the inside of the visual warning device and capable of being angularly moved in different horizontal and vertical direction for lighting, the interior spotlight comprises a base means fixedly placed in the inside of the flashing-light shell of the visual warning device, a swivel seat pivotally mounted onto the base means and capably moved a panning movement corresponding to the base means, a light module having a bulb for lighting, pivotally mounted to the swivel seat and capably moved a tilting movement corresponding to the swivel seat; a vertical drive means by uncovered design mounted onto the swivel seat and having the ability to vertically drive the light module moved in tilting movement for lighting; and a horizontal drive means also by uncovered design mounted onto the swivel seat and having the ability to drive the swivel seat and the light module moved in panning movement for lighting. Likewise, due to each interior spotlight having its own corresponding beacon-like waterproof cover as an exposed waterproof accessory, the further specific structure of the interior spotlight is that both the vertical drive means and the horizontal drive means are unnecessarily concealed or placed in the inside of the interior spotlight as before, on the contrary, by uncovered design both the vertical drive means and the horizontal drive means are easily assembled as a whole, and the interior spotlight is capable of being designed to have much simpler structure than before. Therefore, the visual warning device of the present invention takes unexpected results in respects of much simpler structure and more saving cost.

DETAILED DESCRIPTION OF THE PREFERRED EMBODIMENT

Figure 1:
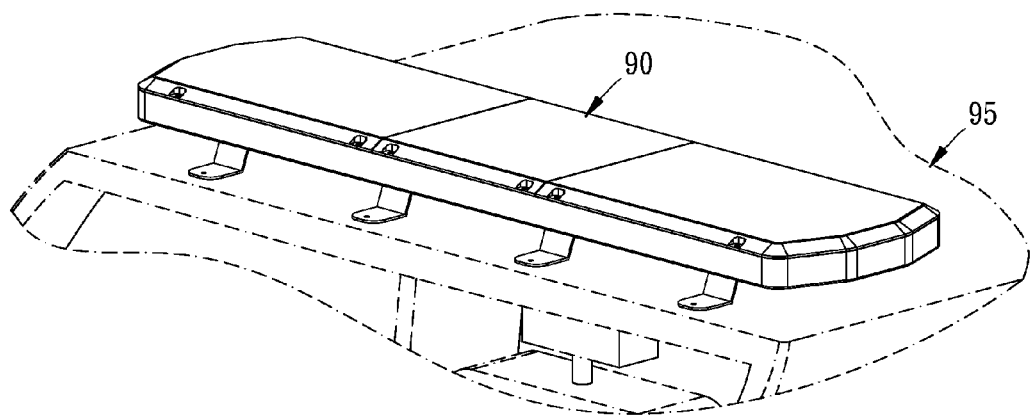
FIG. 1 is a perspective view of an emergency vehicle equipped with a conventional flashing colored light on the roof of the vehicle to produce a variety of warning light signals.
Figure 2:
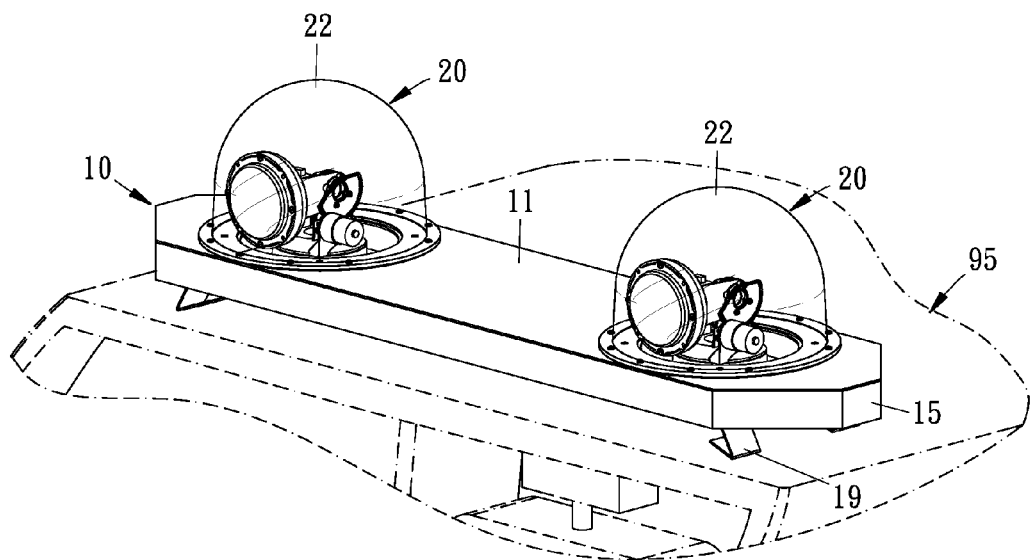
FIG. 2 is a perspective view of a visual warning device of this present invention due to having one or more interior spotlights mounted inside capably fitted onto the roof of an emergency vehicle for both emergency use and lighting use.
Figure 3:
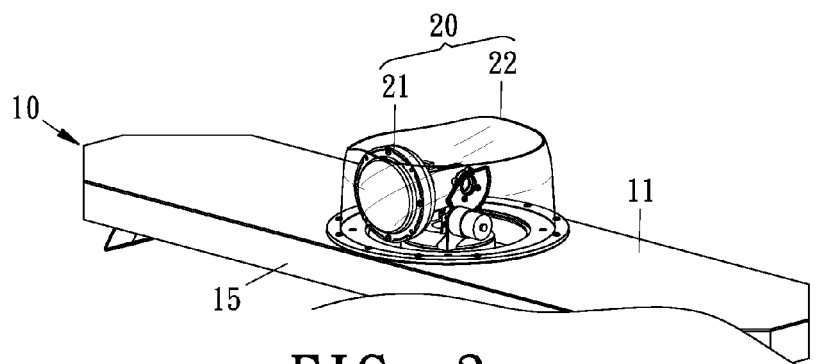
FIG. 3 is a partial perspective drawing of a visual warning device of this present invention to illustrate an interior spotlight mounted in the inside of the visual warning device has a beacon-like waterproof cover mounted onto a covered plate of the visual warning device as its own waterproof cover.

Referring to FIGS. 2 and 3, a preferred embodiment of a visual warning device 10 of the present invention is not only capably served as a warning signal light to provide various colored flashing lights for emergency use but also capably served as a spotlight to provide its light beam angularly adjusted in different horizontal and vertical direction for lighting or illumination.

The visual warning device 10 of the present invention is used for placement on the roof of an emergency vehicle 95 such as fire truck, police car and ambulance, when confronted with a situation, a driver of the emergency vehicle 95 may immediately manipulate the visual warning device 10 of the present invention to issue a flashing warning light with different colors and/or to lighten on any site that requires lighting. Therefore, the visual warning device 10 of present invention has duel functions applicable for an emergency vehicle 95 for emergency use and/or for illumination use.

Figure 4:
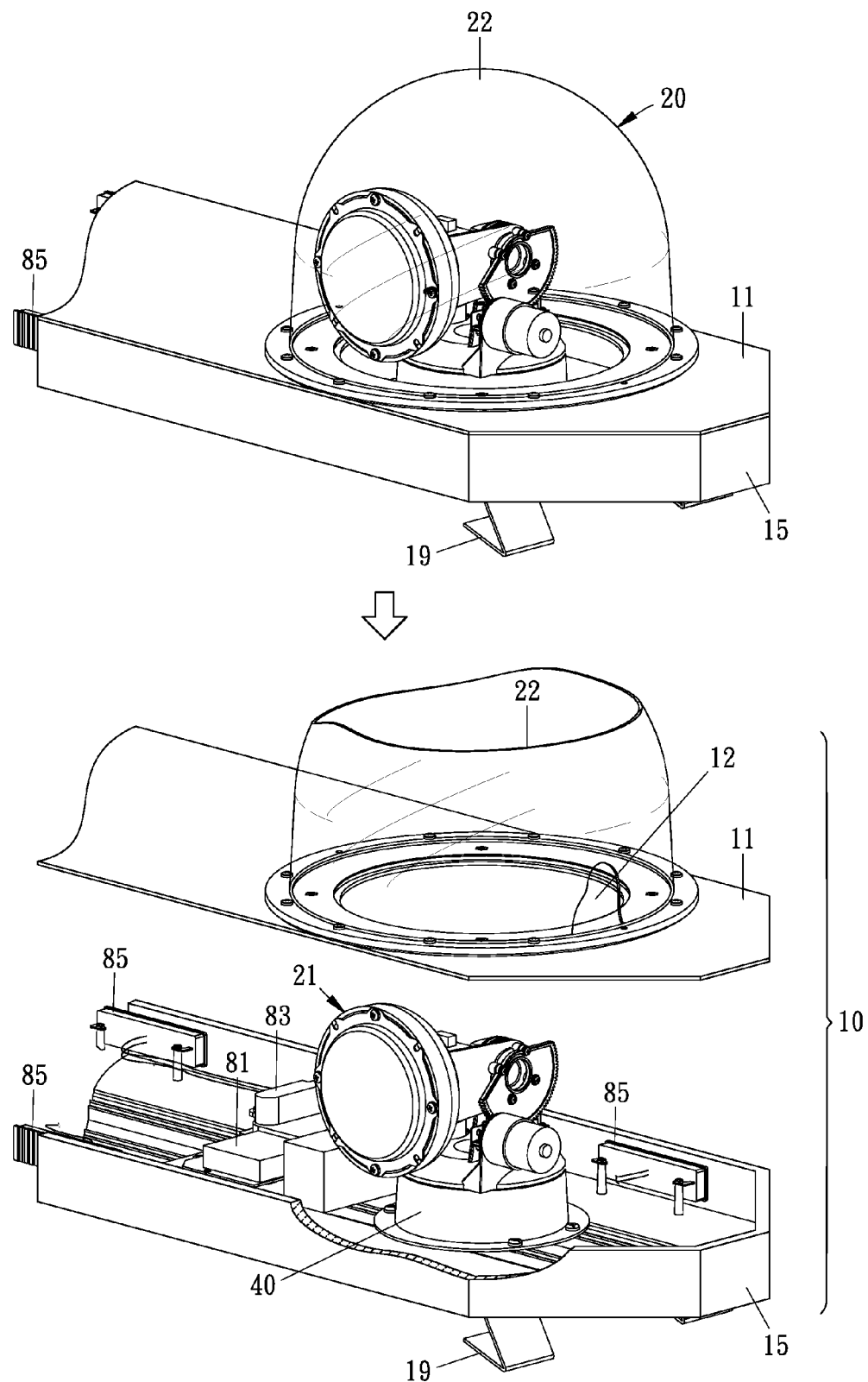
FIG. 4 is a partially exploded view of the visual warning device of this present invention.

Referring to from FIG. 2 to FIG. 4, the visual warning device 10 of the present invention comprises a covered plate 11, a flashing-light shell 15 and one or more lighting devices 20. And, the covered plate 11 is a flat-like plate having one or more receiving holes 12 evenly formed thereon, and the covered plate 11 is served as an assembling cover designed to be tightly covered onto and assembled with the flashing-light shell 15.

Each lighting device 20 comprises a combination of an interior spotlight 21 and a beacon-like waterproof cover 22, wherein the interior spotlight 21 is fixedly placed in the inside of the flashing-light shell 15 and the beacon-like waterproof cover 22 is exposed outside and securely fastened onto the receiving holes 12 of the covered plate 11 to have the interior spotlight 21 become mostly shielded with the corresponding beacon-like waterproof cover 22 after completion of assembly.

The beacon-like waterproof cover 22 is made of transparent material, if completely fastened onto the covered plate 11, the beacon-like waterproof cover 22 not only allows the interior spotlight 21 capably provided with function of lighting or illumination but also provides a waterproof function to prevent from rainwater infiltrated to wet the interior spotlight 21.

Referring to FIG. 4, the flashing-light shell 15 is a box-like transparent or translucent accessory to the visual warning device 10 of the present invention. In particular, the flashing-light shell 15 is preferably a kind of LED-based warning light means capable of displaying flashing symbols, reverse characters or arrows, which comprises a microcontroller 81, a power supplied means 83 and a plurality of programmable LEDs 85 all assembled inside.

The power supplied means 83 is a 12-volt DC power source which power source is supplied from the emergency vehicle 95 through a plug or from a battery. And, the electrical power required for either the microcontroller 81 or the programmable LEDs 85 is suitably supplied from the power supplied means 83.

The microcontroller 81 is not only capably programmed to communicate instructions to each programmable LEDs 85 but also caused the programmable LEDs 81 to flash colored warning lights in one or more predetermined patterns or sequences for emergency use.

Further, another embodiment of the flashing-light shell 15 is a kind of mechanical warning light means, which comprises a plurality of revolving and oscillating lamps (not drawing) assembled inside, each having a combination of reflective back support members and colored filters is capably rotated or oscillated via mechanical means to display various colored warning light signals for emergency use.

Figure 5:
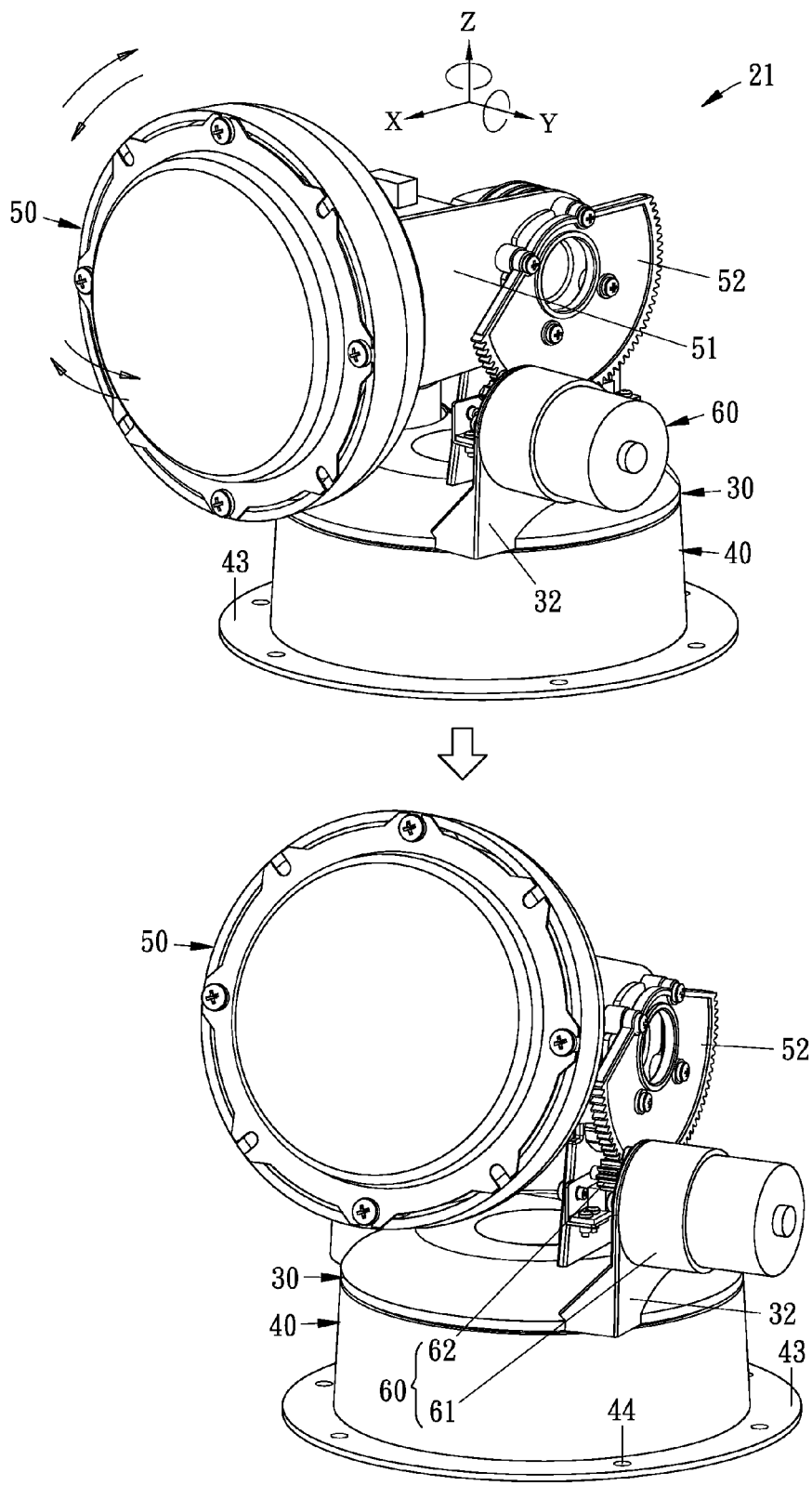
FIG. 5 is an illustrated drawing to show the interior spotlight capable of being angularly moved in different horizontal and vertical direction for lighting.
Figure 6:
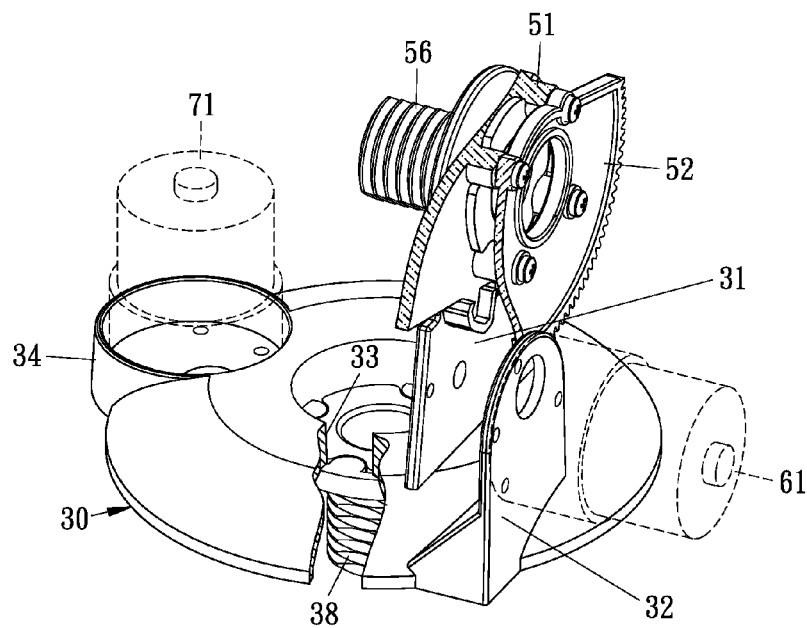
FIG. 6 is an illustrated drawing to show that a swivel seat of the interior spotlight of this present invention is provided for both a vertical drive means and a horizontal drive means by uncovered design fixedly mounted thereon.
Figure 7:
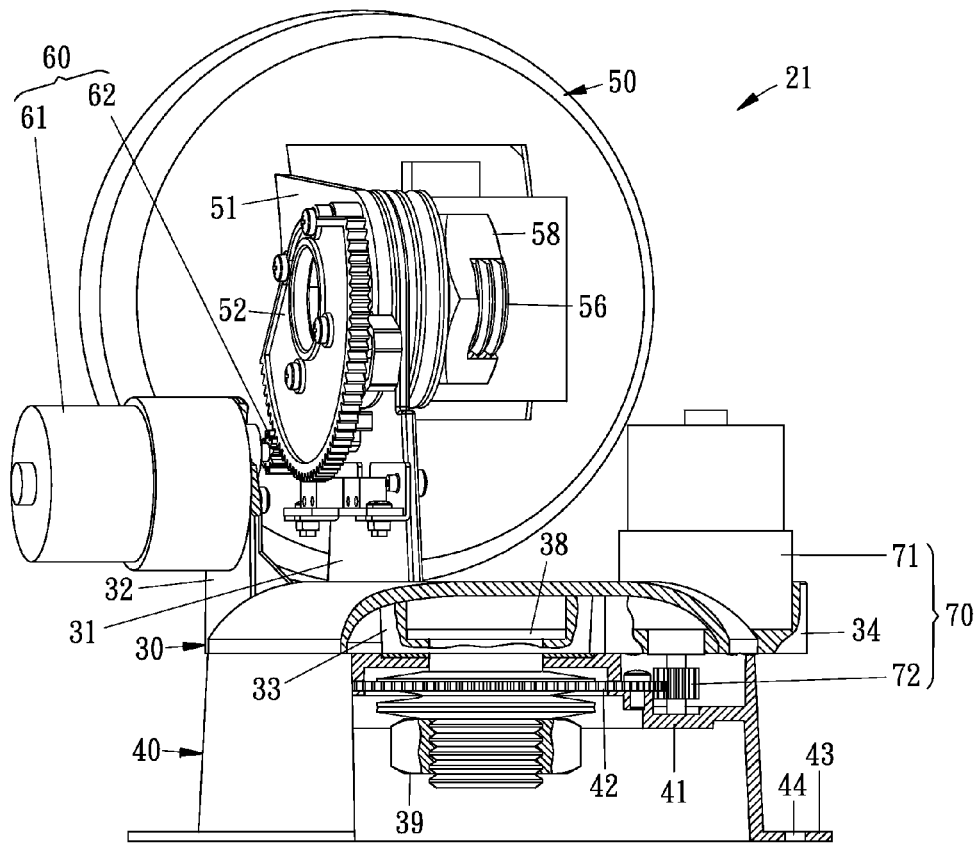
FIG. 7 is a partially cross sectional drawing of the interior spotlight of FIG. 5 to show a base seat of the spotlight of this present invention is fixedly mounted with a static gear inside.

Referring to FIG. 2 and FIG. 4, the flashing-light shell 15 has fixed means 19 installed on the bottom, and the fixed means 19 are designed to have the visual warning device 10 of the present invention permanently fixed on the roof of an emergency vehicle 95, Referring to from FIG. 5 to FIG. 7, each interior spotlight 21 comprises a swivel seat 30, a base means 40, a light module 50, a vertical drive means 60 and a horizontal drive means 70. And, the base means 40 is fixedly placed in the inside of the flashing-light shell 15 and also provided for the swivel seat 30 pivotally mounted thereon and then capably moved a panning movement corresponding to the base means 40; the light module 50 is pivotally mounted to the swivel seat 30 for capably moved a tilting movement corresponding to the swivel seat 30; the vertical drive means 60 is designed as an uncovered structure mounted onto the swivel seat 30 for vertically driving the light module 50 moved in tilting movement; and the horizontal drive means 70 is also designed as an uncovered structure mounted onto the swivel seat 30 for driving the swivel seat 30 and the light module 50 moved in panning movement.

For each interior spotlight 21 capably operated by either manually remotely control or wireless remotely control or both, the microcontroller 81 further has a function through a received manually remote-controlled or wireless remote-controlled signal to control the power supplied means 83 to supply electrical power to each interior spotlight 21 if required for lighting and/or simultaneously supply electrical power to the vertical drive means 60 and/or the horizontal drive means 70 if required for adjusting the lighting capably projected in a preferable direction.

Referring to FIG. 5 and FIG. 7, the base means 40 of the interior spotlight 21 is a tube-like object which comprises a cross spacer 41 integrally formed inside and a static gear 42 firmly fastened onto the cross spacer 41. In addition, the base means 40 further has a flange 43 with plural fasten holes 44 provided for fixedly mounting the interior spotlight 21 in the inside of the flashing-light shell 15 through fastening parts.

The light module 50 of the interior spotlight 21 includes a bulb for lighting (not shown), an extended lever 51 served as a linking lever for making a pivotal combination, a vertical gear member 52 firmly mounted onto the extended lever 51 and formed as an integral structure, a pivotal bolt 56 used for making the extended lever 51 constituted a pivotal combination with the swivel seat 30 and a fastening nut 58 used for connection with the pivotal bolt 56.

The swivel seat 30 of the interior spotlight 21 is a disc-like accessory to the interior spotlight 21 of the present invention, which disc-like body comprises a first risen spacer 31, a second risen spacer 32, a first recessed hole 33 and a second recessed hole 34, wherein the first risen spacer 31 is provided for the pivotal bolt 56 of the light module 50 freely passed for joining the light module 50 and the swivel seat 30 together to constitute a pivotal assembly by means of the fastening nut 58.

The second risen spacer 32 of the swivel seat 30 is provided for the vertical drive means 60 by uncovered design firmly mounted thereon. And, the vertical drive means 60 includes a reversible gear motor 61 having an output shaft joined with a pinion means 62 for engaging the vertical gear member 52 of the light module 50.

When the microcontroller 81 of the flashing-light shell 15 is to control the pinion means 62 of the reversible gear motor 61 rotated in either clockwise or counterclockwise rotation, the light module 50 is driven to move in tilting movement through the vertical gear member 52 is synchronously driven from the pinion means 62 to rotate an opposite rotation.

Referred to FIG. 6 and FIG. 7, the first recessed hole 33 of the swivel seat 30 is provided for a pivotal bolt 38 firmly mounted therein, and the pivotal bolt 38 is used for joining the swivel seat 30 and the base means 40 together to constitute a pivotal assembly after a fastening nut 39 is connected with the pivotal bolt 38.

The second recessed hole 34 of the swivel seat 30 is provided for the horizontal drive means 70 by uncovered design firmly mounted therein. And, the horizontal drive means 70 includes a reversible gear motor 71 having an output shaft joined with a pinion means 72 for engaging the static gear 42 of the base means 40 to constitute a planetary gear mechanism.

When the microcontroller 81 of the flashing-light shell 15 is to control the pinion means 72 of the reversible gear motor 71 rotated in either clockwise or counterclockwise rotation, both the swivel seat 30 and the light module 50 are synchronously driven to move in panning movement due to the vertical gear member 52 being actuated to move a planetary gearing motion.

Accordingly, the visual warning device 10 of the present invention is applicable to an emergency vehicle 95 if needed for emergency use to provide various flashing colored light signals as usual or/and if needed for lighting use to adjustably project illuminable lighting in any preferable directions through manually remotely control or wireless remotely control or both.

Due to each interior spotlight 21 having a beacon-like waterproof cover 22 as an exposed waterproof accessory, the specific structure of the interior spotlight 21 of the present invention is that an additional lamp-covered means pivotally mounted to the light module 50 as a waterproof shade is no required than before, and more particularly the vertical drive means 60 for a tilting movement and the horizontal drive means 70 for a panning movement are capable of being designed to an outside exposed structure, i.e., the vertical drive means 60 and the horizontal drive means 70 by uncovered design are unnecessarily concealed or placed in the inside of the interior spotlight 21 as before.

Consequently, due to the interior spotlight 21 of the lighting device 20 having much simpler structure than before, the visual warning device 10 of the present invention takes unexpected results in respects of much simpler structure and more saving cost.

What is claimed is:

1. A visual warning device comprising a box-like flashing-light shell having LED-based warning light means for displaying flashing symbols, reverse characters or arrows, a covered plate having one or more receiving holes evenly formed thereon and tightly covered onto and assembled with the flashing-light shell and one or more lighting device through manually remotely control or/and wireless remotely control to adjust the lighting projected in preferable direction, wherein each lighting device comprises an interior spotlight fixedly placed in the inside of the flashing-light shell and a beacon-like waterproof cover for mostly shielding the interior spotlight by outside exposure securely fastened onto the receiving holes of the covered plate, and the interior spotlight further comprises a light module comprising a bulb for lighting, an extended lever served as a linking lever for making a pivotal combination and a vertical gear member firmly mounted onto the extended lever;

a vertical drive means comprising a reversible gear motor having an output shaft joined with a pinion means;

a horizontal drive means comprising a reversible gear motor having an output shaft joined with a pinion means;

a base means fixedly mounted in the inside of the flashing-light shell and comprising a cross spacer integrally formed inside and a static gear firmly fastened onto the cross spacer; and a disc-like swivel seat comprising a first risen spacer provided for making a pivotal combination with the extended lever of the light module through a first pivotal bolt freely passed and connected with a first fastening nut;

a second risen spacer provided for the vertical drive means by uncovered design firmly mounted thereon to have its own pinion means engaged with the vertical gear member of the light module for having the ability to drive the light module moved in tilting movement;

a first recessed hole provided for a second pivotal bolt mounted therein to join the swivel seat and the base means together as a pivotal assembly with a second fastening nut; and a second recessed hole provided for the horizontal drive means by uncovered design firmly mounted therein to have its own pinion means engaged with the static gear of the base means for having the ability to drive the swivel seat and the light module moved in panning movement.

2. The visual warning device as defined in claim 1, wherein the LED-based warning light means comprises a microcontroller, a power supplied means to supply 12-volt DC power and a plurality of programmable LEDs to flash colored light signals in one or more predetermined patterns or sequences, wherein microcontroller is programmed to control the power supplied means to supply electrical power required for the programmable LEDs, the light module, the vertical drive means or the horizontal drive means respectively.

3. The visual warning device as defined in claim 1, the base means has a flange with plural fasten holes provided for fixedly mounting the interior spotlight in the inside of the flashing-light shell through fastening parts.

* * * * *